(12) United States Patent
Bates

(10) Patent No.: US 6,387,563 B1
(45) Date of Patent: May 14, 2002

(54) METHOD OF PRODUCING A THIN FILM BATTERY HAVING A PROTECTIVE PACKAGING

(75) Inventor: John Bates, Marietta, GA (US)

(73) Assignee: Johnson Research & Development, Inc., Smyrna, GA (US)

(*) Notice: Subject to any disclaimer, the term of this patent is extended or adjusted under 35 U.S.C. 154(b) by 0 days.

(21) Appl. No.: 09/536,535

(22) Filed: Mar. 28, 2000

(51) Int. Cl.[7] .............................. H01M 6/40; H01M 6/00
(52) U.S. Cl. ........................ 429/124; 429/162; 429/127; 29/623.2; 29/623.4; 29/623.5
(58) Field of Search ........................... 29/623.2, 623.5, 29/623.4; 429/127, 162, 124

(56) References Cited

U.S. PATENT DOCUMENTS

| | | | |
|---|---|---|---|
| 3,237,078 A | 2/1966 | Mallory | 320/17 |
| 3,393,355 A | 7/1968 | Whoriskey et al. | 320/18 |
| 4,303,877 A | 12/1981 | Meinhold | 320/18 |
| 4,614,905 A | 9/1986 | Petersson et al. | 320/18 |
| 4,654,281 A | 3/1987 | Anderman et al. | 429/209 |
| 4,719,401 A | 1/1988 | Altmejd | 320/13 |
| 5,270,635 A | 12/1993 | Hoffman et al. | 320/21 |
| 5,291,116 A | 3/1994 | Feldstein | 320/4 |
| 5,314,765 A | 5/1994 | Bates | |
| 5,336,573 A | 8/1994 | Zuckerbrod et al. | 429/252 |
| 5,338,625 A | 8/1994 | Bates et al. | |
| 5,362,581 A | 11/1994 | Chang et al. | 429/249 |
| 5,387,857 A | 2/1995 | Honda et al. | 320/18 |
| 5,411,592 A | 5/1995 | Ovsbinsky et al. | 118/718 |
| 5,445,906 A | 8/1995 | Hobson et al. | 429/162 |
| 5,455,126 A | 10/1995 | Bates et al. | 429/127 |
| 5,512,147 A | 4/1996 | Bates et al. | 204/192.15 |
| 5,561,004 A | 10/1996 | Bates et al. | 429/162 |
| 5,567,210 A | 10/1996 | Bates et al. | 29/623.5 |
| 5,569,520 A | 10/1996 | Bates | 429/162 |
| 5,597,660 A | 1/1997 | Bates et al. | |
| 5,612,152 A | 3/1997 | Bates | 429/152 |
| 5,654,084 A | 8/1997 | Egert | 428/215 |
| 5,778,515 A | 7/1998 | Menon | 28/623.4 |
| 5,783,928 A | 7/1998 | Okamura | 320/122 |
| 5,811,205 A | 9/1998 | Andrieu et al. | 429/137 |
| 5,821,733 A | 10/1998 | Turnbull | 320/116 |
| 6,168,884 B1 * | 1/2001 | Neudecker et al. | 429/162 |

OTHER PUBLICATIONS

Journal of Power Sources, P. Fragnaud, R. Nagarajan, D.M. Schleich, D. Vujic, Thin–film cathodes for secondary lithium batteries, 1995, no month.

Materials Research Society, The Preparation and Characterization of Lithium Cobalt Oxide Thin Films by LPCVD, 1996, no month.

Journal of Power Sources, Thin film solid electrolytes and electrodes for rechargeable lithium–ion batteries, J. Schoonman, E.M. Kelder, 1997, no month.

Solid State Ionics, Fabrication of LiCoO2 thin film cathodes for rechargable lithium battery by electrostatic spray pyrolysis, C.H. Chen et al., 1995, no month.

Journal of Materials Science, Unique porous LiCoO2 thin layers prepared by electrostatic spray deposition. C.H. Chen et al., 1996, no month.

* cited by examiner

*Primary Examiner*—Carol Chaney
*Assistant Examiner*—Tracy Dove
(74) *Attorney, Agent, or Firm*—Baker, Donelson Bearman & Caldwell

(57) ABSTRACT

A method of providing a packaging system for a thin film battery (20) is now provided wherein the battery cell is treated with an epoxy (41) prior to the placement of an overlying glass layer (42). The positioning of the glass layer causes the migration or spreading of the epoxy layer across the battery cell.

16 Claims, 1 Drawing Sheet

METHOD OF PRODUCING A THIN FILM BATTERY HAVING A PROTECTIVE PACKAGING

TECHNICAL FIELD

This invention relates to thin film battery construction, and more particularly to a method of producing thin film batteries having a protective packaging.

BACKGROUND OF THE INVENTION

The metal lithium of thin film batteries reacts rapidly upon exposure to atmospheric elements such as oxygen, nitrogen, carbon dioxide and water vapor. Thus, the lithium anode of a thin film battery will react in an undesirable manner upon exposure to such elements if the anode is not suitably protected. Other components of a thin film battery, such as a lithium electrolyte and cathode films, also require protection from exposure to air although these components are commonly not as reactive as thin metal anode films. It should therefore be desirable to incorporate within a lithium battery, which includes an anode of lithium and other air-reactive components, a packaging system that satisfactorily protects the battery components from exposure to air.

In the past packaging systems for batteries have been devised which included a shield which overlays the active components of the battery. These shields have been made of a ceramic material, a metallic material, and a combination of ceramic and metallic material. The construction of thin film batteries however has proven to be quite difficult to produce and in providing an appropriate barrier as gas pockets may be captured between the anode and the protective layer during construction.

Another thin film battery packaging system has been devised wherein alternating layers of parylene and titanium are laid over the active components. The alternating layers are provided to restrict the continuation of pin holes formed in the layers during construction. This method of producing a protective layer has been difficult to achieve and has provided a protective layer which remains effective for only a few months.

Accordingly, it is seen that a need remains for a method of producing a protective packaging of a thin film battery which protects the active components from atmospheric elements. It is to the provision of such therefore that the present invention is primarily directed.

SUMMARY OF THE INVENTION

In a preferred form of the invention a method of sealing a battery cell comprising the steps of positioning a quantity of epoxy upon the battery cell, and positioning a layer of air impermeably material upon the quantity of epoxy so as to cause the epoxy layer to spread across the battery cell and thereby force gases to be expelled from between the battery cell and the overlying glass layer.

DETAILED DESCRIPTION

Figure 1:
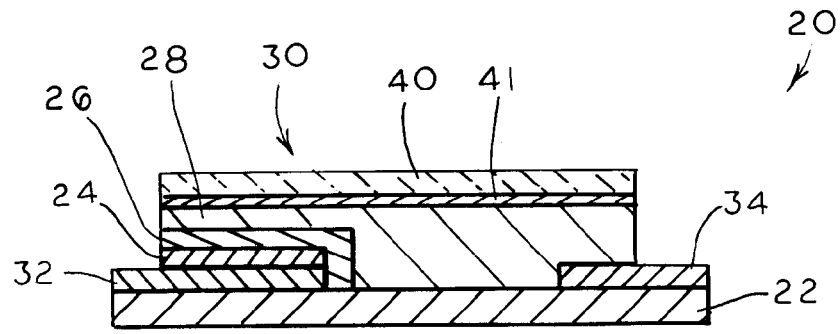
FIG. 1 is a schematic cross sectional view of a thin film battery made in accordance with the method of the present invention.

With reference next to the drawings, there is shown a thin film battery 20 which incorporates a packaging system in accordance with the present invention. The battery 20 includes components which have been built up onto a substrate 22. The battery 20 includes a cathode 24, an electrolyte 26 and an anode 28, wherein each component is provided by a film deposited in a predetermined fashion upon the substrate 22. It is a feature of the battery 20 that its packaging system is in the form of a protective sheath 30 which overlies and coats the anode of the battery so that the sheath provides a barrier against the penetration of air and water vapor.

The substrate underlying the battery 20 may be comprised of glass, alumina, sapphire or various semiconductor or polymer materials. To enable electrical power to be withdrawn from the battery 20, two current collector films 32 and 34 are deposited upon the substrate 22, and then the cathode film 24 is deposited upon the collector 32. The current collector film 32 and 34 are separated from each other as shown in FIG. 1.

The electrolyte film 26 is deposited in place so as to cover the cathode film 24. Preferably, the electrolyte 26 is an amorphous lithium phosphorus oxynitride having the composition $Li_xPO_yN_z$. The anode 28 is comprised of lithium and is deposited upon the previously formed films 24, 26 and 28 so as to directly overlie a substantial portion of the electrolyte 26.

The protective shield 30 overlies and covers the entire top surface of the anode 28 which would otherwise be left exposed to the atmosphere. In addition, the shield 30 is advantageous in that it acts as an impermeable barrier through which air and water vapor cannot penetrate. Such an advantage can be readily appreciated in connection with the component films which include an amount of lithium, which is highly reactive to atmospheric elements. The protective shield itself includes two layers, a top, glass layer 40 and an epoxy layer 41. The glass layer 40 preferably allows the transmission of ultraviolet light so that an ultraviolet light curable epoxy may comprise the epoxy layer 41. The glass layer 40 is sized and shaped to conform with the underlying components of the battery cell.

Figure 2:
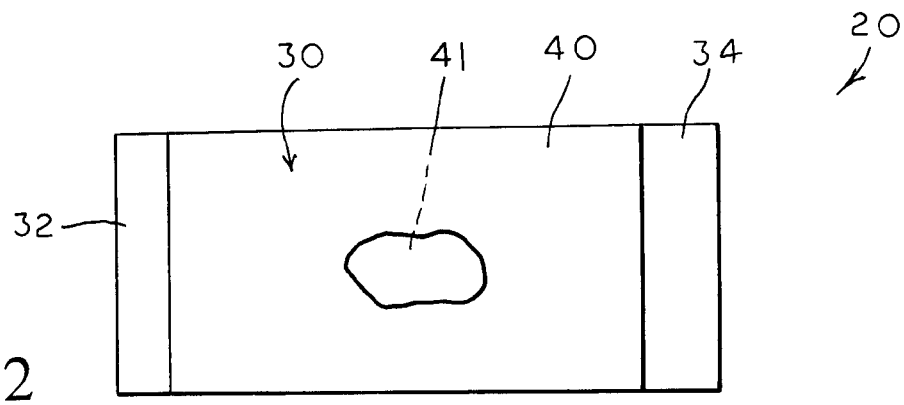
FIGS. 2–4 are a sequence of views showing the construction of a thin film battery packaging, which show in sequence, the thin film battery components being protected with a packaging.
Figure 3:
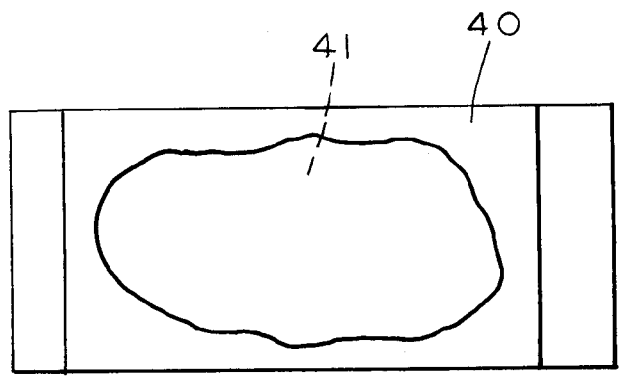
Figure 4:
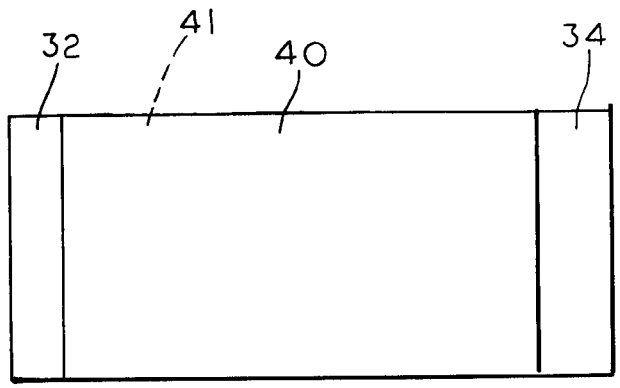

To produce the packaging system in accordance with the present invention the manufacturing process commences with a battery cell wherein the cathode 24, electrolyte 26 and anode 28 are produced in any conventional manner. Once the cell is produced a small amount of liquid epoxy 41, such as Micro-Lite 3010 made by MLT/Micro-Lite Technology Corporation of Mesa, Ariz., is placed proximate the center of the anode 28, as shown in FIG. 2. The epoxy may be applied in any conventional manner such as with the use of a nozzle or syringe. A glass layer, made of material such as Pyrex, model nos. #7950 or #9741 by Corning, Inc of Corning, N.Y. and measuring approximately 0.2 mm, is then positioned upon the liquid epoxy 41 wherein a sufficient force is placed upon the underlying epoxy 41, either by the is weight of the glass layer alone or with an additional outside force, to cause the epoxy to spread outwardly between the glass layer 40 and the anode 28, as shown in FIG. 3. The epoxy 41 spreads until it completely fills the void between the glass layer 40 and the anode 28, as shown in FIG. 4. The amount of epoxy required is determined by the surface area the epoxy must cover once spread. Once the epoxy coating is complete an ultraviolet light is passed through the glass layer 40 to cure the epoxy in a rapid manner.

It should be understood that by placing a quantity of epoxy upon the anode all gases are expelled from between the glass layer 40 and the anode 28 as the epoxy spreads outwardly, thereby preventing the capturing of gas pockets between the glass layer and the anode which would cause the degradation of the anode.

It should be understood that the present invention also includes the use of non-ultraviolet curable epoxies but is not intended to be limited to such as other types of epoxies may be utilized in practicing the present invention. Should non-ultraviolet curable epoxies be utilized and the glass may be substituted with any appropriate ceramic material.

It should also be understood that the present invention is not limited to a method wherein the epoxy is centrally positioned. For example, a peripheral layer of epoxy may be applied to the anode while constructed in an argon atmosphere, thereby encapsulating the argon within the peripheral seal of epoxy. This method may be preferred where it may be necessary to allow flexing or volume changes of the anode, i.e. it allows for expansion.

While this invention has been described in detail with particular reference to the preferred embodiments thereof, it should be understood that many modifications, additions and deletions, in addition to those expressly recited, may be made thereto without departure from the spirit and scope of invention as set forth in the following claims.

What is claimed is:

1. A method of sealing a thin film battery cell comprising the steps of:
   (a) positioning a quantity of epoxy upon the battery cell;
   (b) positioning a layer of air impermeable material upon the quantity of epoxy so as to cause the epoxy to spread across the battery cell and thereby force gases to be expelled from between the battery cell and the overlying air impermeable material.

2. The method of claim 1 wherein the air impermeable material is a ceramic material.

3. The method of claim 2 wherein the ceramic material is an ultraviolet light transmitting glass and wherein the epoxy is an ultraviolet light curable epoxy layer.

4. The method of claim 3 further comprising the step of transmitting ultraviolet light upon the glass so as to be transmitted through the glass to the underlying epoxy layer.

5. A sealed thin film battery cell produced in accordance with the method of claim 1.

6. A sealed thin film battery cell produced in accordance with the method of claim 4.

7. A method of sealing a thin film battery cell comprising the steps of:
   (a) positioning a quantity of epoxy upon the battery cell;
   (b) forcing a layer of air impermeable material upon the quantity of epoxy so as to cause the epoxy to spread between the battery cell and the air impermeable material so as to substantially protect a surface area of the battery cell with the overlying air impermeable material.

8. The method of claim 7 wherein the air impermeable material is a ceramic material.

9. The method of claim 8 wherein the ceramic material is an ultraviolet light transmitting glass and wherein the epoxy is an ultraviolet light curable epoxy layer.

10. The method of claim 9 further comprising the step of transmitting ultraviolet light upon the glass so as to be transmitted through the glass to the underlying epoxy.

11. A sealed thin film battery cell produced in accordance with the method of claim 7.

12. A sealed thin film battery cell produced in accordance with the method of claim 10.

13. A thin film battery including components which are capable of reacting upon exposure to air and water vapor, the improvement comprising;
    a thin protective layer overlying and coating at least a portion of the battery components so that the protective layer provides a thin film barrier against the penetration of air and water vapor; and
    an underlying coating of epoxy between the battery components and the protective layer.

14. The thin film battery of claim 13 wherein the protective layer is a ceramic layer.

15. The thin film battery of claim 14 wherein the protective layer is an ultraviolet light transmitting glass and wherein the epoxy layer is an ultraviolet light curable epoxy layer.

16. A thin film battery including components which are capable of reacting upon exposure to air, the improvement comprising;
    a protective sheath overlying and coating the battery components so that the sheath provides a thin film barrier against the penetration of air, wherein the protective sheath includes a layer of ultraviolet light transmitting ceramic material and a layer of ultraviolet light curable epoxy positioned between the battery components and the ceramic material.

* * * * *